US012796670B2

(12) United States Patent
Thompson et al.

(10) Patent No.: US 12,796,670 B2
(45) Date of Patent: Nov. 17, 2026

(54) FISHING HOOK COVER DEVICE

(71) Applicants: Daniel Thompson, Live Oak, FL (US); David Croft, Inverness, FL (US)

(72) Inventors: Daniel Thompson, Live Oak, FL (US); David Croft, Inverness, FL (US)

( * ) Notice: Subject to any disclaimer, the term of this patent is extended or adjusted under 35 U.S.C. 154(b) by 0 days.

(21) Appl. No.: 18/910,406

(22) Filed: Oct. 9, 2024

(65) Prior Publication Data

US 2025/0344682 A1 Nov. 13, 2025

Related U.S. Application Data

(60) Provisional application No. 63/646,103, filed on May 13, 2024.

(51) Int. Cl.
*A01K 97/06* (2006.01)
*A01K 87/00* (2006.01)

(52) U.S. Cl.
CPC ............ *A01K 97/06* (2013.01); *A01K 87/009* (2022.02)

(58) Field of Classification Search
CPC .............................. A01K 97/06; A01K 87/009
See application file for complete search history.

(56) References Cited

U.S. PATENT DOCUMENTS 4,015,361 A * 4/1977 O'Reilly ................ A01K 97/06 43/57.1
4,040,202 A * 8/1977 Wille ..................... A01K 97/06 D3/905
4,203,245 A * 5/1980 Peterson ................ A01K 97/06 D22/199
4,452,003 A * 6/1984 Deutsch ................. A01K 97/06 206/315.11
4,631,856 A * 12/1986 Born ...................... A01K 97/06 206/315.11
4,771,564 A * 9/1988 Whitley ................. A01K 97/04 43/25
4,831,772 A * 5/1989 Gillespie ................ A01K 97/06 43/25
4,884,357 A * 12/1989 Clifford ................. A01K 97/06 43/42.37
4,920,683 A * 5/1990 Weber .................... A01K 97/06 D22/136
4,944,111 A * 7/1990 Daniel ................... A01K 97/06 43/57.1

(Continued)

*Primary Examiner* — Jessica B Wong
(74) *Attorney, Agent, or Firm* — Brennan, Manna & Diamond, LLC

(57) ABSTRACT

A fishing hook cover device is provided. The device is comprised of a buoyant device designed to prevent the loss of a fishing rod if dropped in water, while also securing the fishing hook and lure to prevent injury or snagging. The device comprises a body made of waterproof, buoyant foam material that can float and increase the visibility of the rod in low-light conditions through the use of bright colors or reflective elements. The body is typically cylindrical and split into two semi-cylindrical halves connected by a hinge, which can be locked together around the rod, hook, and lure using a locking mechanism. To prevent hooks from catching on the interior, the device features rigid protective members and fasteners that secure the lure and hook inside. Additionally, the body may include an opening for attaching a lanyard for convenient storage.

9 Claims, 3 Drawing Sheets

(56) References Cited

U.S. PATENT DOCUMENTS

| | | | | |
|---|---|---|---|---|
| 5,446,990 | A * | 9/1995 | Eriksson | A01K 97/06 43/57.1 |
| 5,475,942 | A * | 12/1995 | Tatum | A01K 97/06 43/25.2 |
| 5,588,245 | A * | 12/1996 | Vance | A01K 97/06 43/57.1 |
| 5,862,622 | A * | 1/1999 | Sandman | A01K 87/007 43/25 |
| 6,023,876 | A * | 2/2000 | Haddad | A01K 97/06 43/57.1 |
| 6,085,455 | A * | 7/2000 | Bracken | A01K 97/08 43/25 |
| 6,606,814 | B1 * | 8/2003 | Weaver | A01K 97/06 43/25.2 |
| 6,691,448 | B2 * | 2/2004 | Jones | A01K 97/06 43/42.4 |
| 7,299,582 | B1 * | 11/2007 | Whitehead | A01K 97/06 43/25.2 |
| 8,635,803 | B1 * | 1/2014 | Cartwright | A01K 93/02 43/44.88 |
| 8,938,907 | B2 * | 1/2015 | Meade | A01K 85/02 43/42.43 |
| 9,497,951 | B1 * | 11/2016 | Stefanko | A01K 97/06 |
| 2002/0104253 | A1 * | 8/2002 | Terry | A01K 97/06 43/57.1 |
| 2002/0129538 | A1 * | 9/2002 | Buzzell | A01K 97/06 43/55 |
| 2002/0194769 | A1 * | 12/2002 | Wicker | A01K 97/06 43/25.2 |
| 2004/0250462 | A1 * | 12/2004 | Trebil | A01K 97/06 43/25.2 |
| 2005/0091906 | A1 * | 5/2005 | D'Alusio | A01K 97/06 43/25.2 |
| 2005/0178042 | A1 * | 8/2005 | Dodge | A01K 97/06 43/57.1 |
| 2006/0162233 | A1 * | 7/2006 | Hueso Pajares | A01K 93/00 43/44.87 |
| 2007/0017147 | A1 * | 1/2007 | Manzo | A01K 97/06 43/57.1 |
| 2007/0157505 | A1 * | 7/2007 | Dodge | A01K 97/06 43/57.1 |
| 2009/0094881 | A1 * | 4/2009 | Konopa | A01K 97/06 43/57.1 |
| 2009/0301911 | A1 * | 12/2009 | Rubin | A01K 97/06 206/315.11 |
| 2012/0102814 | A1 * | 5/2012 | Christensen | A01K 97/06 43/25.2 |
| 2015/0327529 | A1 * | 11/2015 | Zimmerman | A01K 99/00 43/54.1 |
| 2016/0037760 | A1 * | 2/2016 | Melvin | A01K 97/06 43/25.2 |
| 2018/0317472 | A1 * | 11/2018 | Moffett | A01K 97/06 |
| 2019/0373879 | A1 * | 12/2019 | VanAusdal | A01K 97/06 |
| 2020/0359614 | A1 * | 11/2020 | Mcniel | B65D 43/22 |
| 2021/0153488 | A1 * | 5/2021 | White | A01K 97/06 |
| 2021/0219532 | A1 * | 7/2021 | Bessac | B25H 3/02 |
| 2021/0386047 | A1 * | 12/2021 | Dishong | A01K 97/06 |
| 2022/0174927 | A1 * | 6/2022 | Weller | A01K 97/06 |
| 2023/0009471 | A1 * | 1/2023 | Byes | A01K 97/06 |
| 2024/0349711 | A1 * | 10/2024 | Opelt | A01K 97/04 |
| 2025/0344682 | A1 * | 11/2025 | Thompson | A01K 87/009 |

* cited by examiner

FISHING HOOK COVER DEVICE

CROSS-REFERENCE TO RELATED APPLICATION

The present application claims priority to, and the benefit of, U.S. Provisional Application No. 63/646,103, which was filed on May 13, 2024, and is incorporated herein by reference in its entirety.

FIELD OF THE INVENTION

The present invention relates generally to the field of fishing. More specifically, the present invention relates to a fishing hook cover device that provides a buoyant, protective cover that can be attached to a fishing rod around a hook and a lure to also prevent accidental snags and hook damage. Accordingly, the present disclosure makes specific reference thereto. Nonetheless, it is to be appreciated that aspects of the present invention are also equally applicable to other like applications, devices, and methods of manufacture.

BACKGROUND

When a fishing rod is not in use, such as during transportation or storage, the attached lure or hook is often left exposed. This can pose a significant risk, as people might accidentally snag the hook on clothing, bags, or even other individuals, leading to potential damage or injury. Hooks can puncture skin, tear fabric, or cause other accidents, especially in crowded environments or when the rod is being moved. Furthermore, if a fishing rod is accidentally dropped into the water while out on a boat or fishing pier, it can quickly sink to the bottom, making retrieval difficult or impossible, potentially resulting in the permanent loss of the rod. To counter this, some anglers attempt to increase the buoyancy of their fishing rods by attaching foam devices, such as pool noodles, to keep the rod afloat if it falls into the water. However, this solution is often seen as inconvenient due to the added bulk and aesthetic impact, and it can sometimes prove ineffective if the foam does not provide enough buoyancy or detaches from the rod. As a result, anglers may still face the risk of losing their equipment despite these makeshift efforts.

Therefore, there exists a long-felt need in the art for a device that can be applied to a fishing rod to improve safety. There also exists a long-felt need in the art for a device that can be applied to a fishing rod to prevent a rod from sinking after falling into a body of water. More specifically, there exists a long-felt need in the art for a fishing hook cover device that protects against accidental hook snags and injuries. In addition, there exists a long-felt need in the art for a fishing hook cover device that protects against accidental hook snags and injuries and wherein the device ensures a fishing rod remains buoyant if dropped in a body of water.

The subject matter disclosed and claimed herein, in one embodiment thereof, comprises a fishing hook cover device. The device is comprised of a buoyant device designed to prevent the loss of a fishing rod if dropped in water, while also securing the fishing hook and lure to prevent injury or snagging. The device comprises a body made of waterproof, buoyant foam material that can float and increase the visibility of the rod in low-light conditions through the use of bright colors or reflective elements. The body is typically cylindrical and split into two semi-cylindrical halves connected by a hinge, which can be locked together around the rod, hook, and lure using a locking mechanism. To prevent hooks from catching on the interior, the device features rigid protective members and fasteners that secure the lure and hook inside. Additionally, the body may include an opening for attaching a lanyard for convenient storage.

In this manner, the fishing hook cover device of the present invention accomplishes all the forgoing objectives and provides a device that can be applied to a fishing rod to improve safety and also prevent a rod from sinking after falling into a body of water. More specifically, the device protects against accidental hook snags and injuries by covering a hook and lure when not in use. In addition, the device ensures a fishing rod remains buoyant if dropped in a body of water by providing a buoyant attachment to the rod.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a fishing hook cover device. The device is comprised of a body preferably comprised of a waterproof foam material. Said material is preferably buoyant such that the body floats in water. As a result, any fishing rod the body is attached to will also float if accidentally dropped in a body of water, thus preventing the sinking and loss of the rod.

The body is comprised preferably of a tubular and/or cylindrical in shape. In the preferred embodiment, the body is comprised of two semi-cylindrical halves wherein the first half attaches to the second half via at least one hinge of any type. The body may also be comprised of at least one locking mechanism that allows the first half to be secured to the second half. More specifically, the halves can be placed around a fishing rod and around a fishing hook and/or lure such that the halves can then be closed around the rod, hook, and/or lure and secured together via the mechanism. This ensures the hook and lure cannot injure or snag any nearby individuals or items, as well as attaches the device to the rod for buoyancy purposes as described above.

To prevent the lure and/or hook from snagging on the interior surface of each half, each interior surface may be comprised of at least one protective member that is preferably comprised of a rigid plastic (or any rigid material that cannot be penetrated by a hook). To further secure the lure and/or hook within the body, any portion of the interior of the body may be comprised of at least one interior fastener, such as but not limited to a spring, to prevent the lure and/or hook from exiting the body during use.

The present invention is also comprised of a method of using the device. First, a device is provided comprised of a body comprised of a first half comprised of a first protective member attached to a second half comprised of a second protective member via a hinge, an interior fastener, and a locking mechanism. Then, the first half can be separated from the second half via disengaging the locking mechanism. Next, the first half and the second half can be placed around a fishing lure and a fishing hook. Then, the hook and/or the lure to the interior fastener. Finally, the first half can be secured to the second half via the locking mechanism such that the hook and lure are secured within the body.

Accordingly, the fishing hook cover device of the present invention is particularly advantageous as it provides a device that can be applied to a fishing rod to improve safety and also prevent a rod from sinking after falling into a body of water. More specifically, the device protects against accidental hook snags and injuries by covering a hook and lure when not in use. In addition, the device ensures a fishing rod remains buoyant if dropped in a body of water by providing a buoyant attachment to the rod. In this manner, the fishing hook cover device provides a solution to unintentional fish hook snags and injuries as well as fishing rod sinking incidents.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
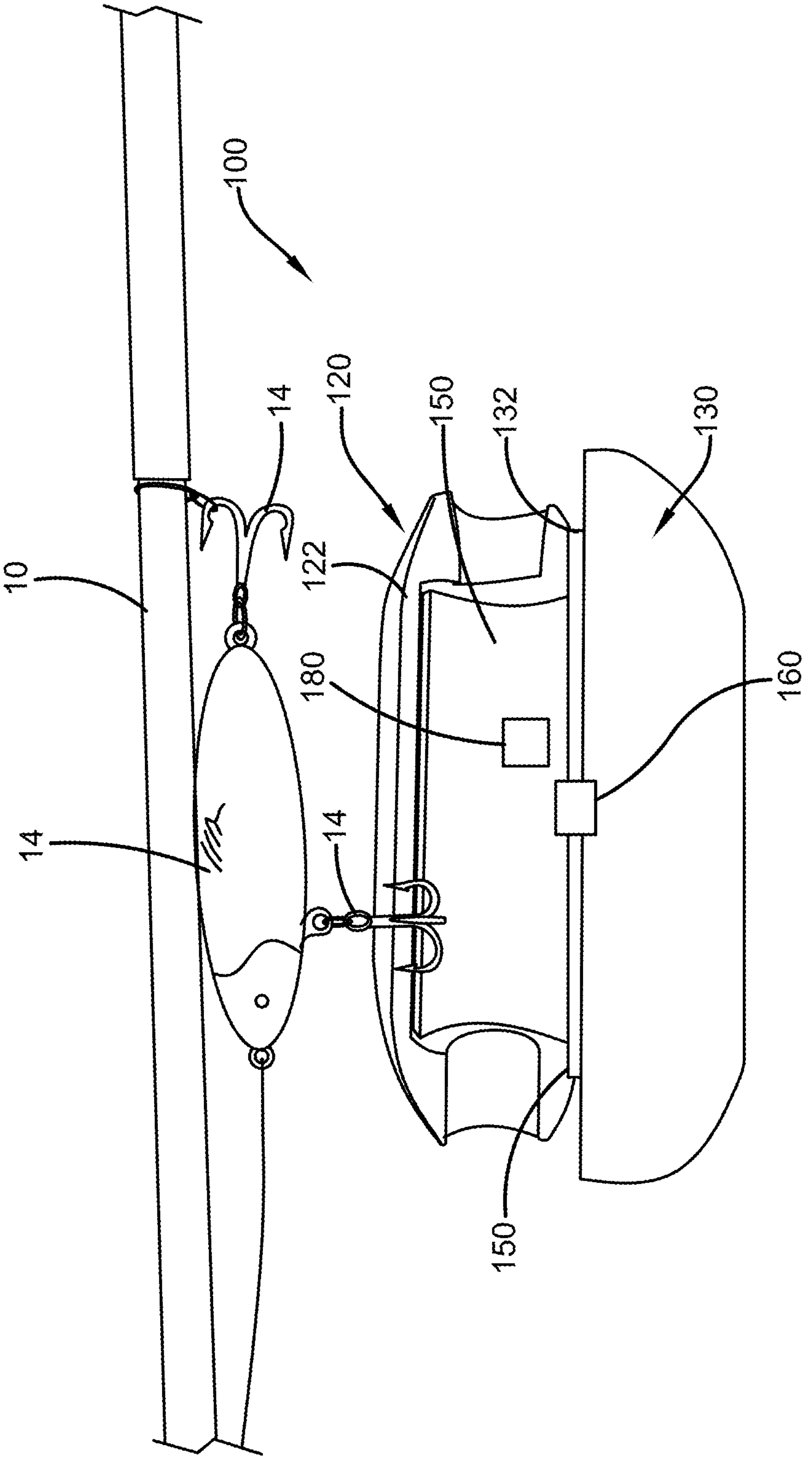
FIG. 1 illustrates a perspective view of one potential embodiment of a fishing hook cover device of the present invention while open in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that can be applied to a fishing rod to improve safety. There also exists a long-felt need in the art for a device that can be applied to a fishing rod to prevent a rod from sinking after falling into a body of water. More specifically, there exists a long-felt need in the art for a fishing hook cover device that protects against accidental hook snags and injuries. In addition, there exists a long-felt need in the art for a fishing hook cover device that protects against accidental hook snags and injuries and wherein the device ensures a fishing rod remains buoyant if dropped in a body of water.

The present invention, in one exemplary embodiment, is comprised of a fishing hook cover device comprised of a body preferably comprised of a waterproof foam material that is preferably buoyant such that the body floats in water. As a result, any fishing rod the body is attached to will also float if accidentally dropped in a body of water, thus preventing the sinking and loss of the rod.

The body is comprised preferably of a tubular and/or cylindrical in shape. In the preferred embodiment, the body is comprised of two semi-cylindrical halves wherein the first half attaches to the second half via at least one hinge of any type. The body may also be comprised of at least one locking mechanism that allows the first half to be secured to the second half. More specifically, the halves can be placed around a fishing rod and around a fishing hook and/or lure such that the halves can then be closed around the rod, hook, and/or lure and secured together via the mechanism. This ensures the hook and lure cannot injure or snag any nearby individuals or items, as well as attaches the device to the rod for buoyancy purposes as described above.

To prevent the lure and/or hook from snagging on the interior surface of each half, each interior surface may be comprised of at least one protective member that is preferably comprised of a rigid plastic (or any rigid material that cannot be penetrated by a hook). To further secure the lure and/or hook within the body, any portion of the interior of the body may be comprised of at least one interior fastener, such as but not limited to a spring, to prevent the lure and/or hook from exiting the body during use.

The present invention is also comprised of a method of using the device. First, a device is provided comprised of a body comprised of a first half comprised of a first protective member attached to a second half comprised of a second protective member via a hinge, an interior fastener, and a locking mechanism. Then, the first half can be separated from the second half via disengaging the locking mechanism. Next, the first half and the second half can be placed around a fishing lure and a fishing hook. Then, the hook and/or the lure to the interior fastener. Finally, the first half can be secured to the second half via the locking mechanism such that the hook and lure are secured within the body.

Accordingly, the fishing hook cover device of the present invention is particularly advantageous as it provides a device that can be applied to a fishing rod to improve safety and also prevent a rod from sinking after falling into a body of water. More specifically, the device protects against accidental hook snags and injuries by covering a hook and lure when not in use. In addition, the device ensures a fishing rod remains buoyant if dropped in a body of water by providing a buoyant attachment to the rod. In this manner, the fishing hook cover device provides a solution to unintentional fish hook snags and injuries as well as fishing rod sinking incidents.

Referring initially to the drawings, FIG. 1 illustrates a perspective view of one potential embodiment of a fishing hook cover device 100 of the present invention while open in accordance with the disclosed architecture. The device 100 is comprised of a body 110. The body 110 is preferably comprised of a waterproof foam material. This includes but is not limited to a closed-cell foam, a neoprene foam, an EVA foam, a polyurethane foam, a PVC foam, etc. Said material is preferably buoyant such that the body 110 floats in water. As a result, any fishing rod 10 to the body 110 is attached to will also float if accidentally dropped in a body of water, thus preventing the sinking and loss of the rod. To increase the visibility of the device 100 (in order to locate the rod 10 if dropped into water during low light conditions) the body 110 may be a bright color such as but not limited to a neon color. The body 110 may also be comprised of at least one reflective element 112 made from a reflective material to increase visibility in low light conditions. In a different embodiment, the element 112 and or the entire body is comprised of a phosphorescent coating or element to increase visibility in low-light conditions.

Figure 2:
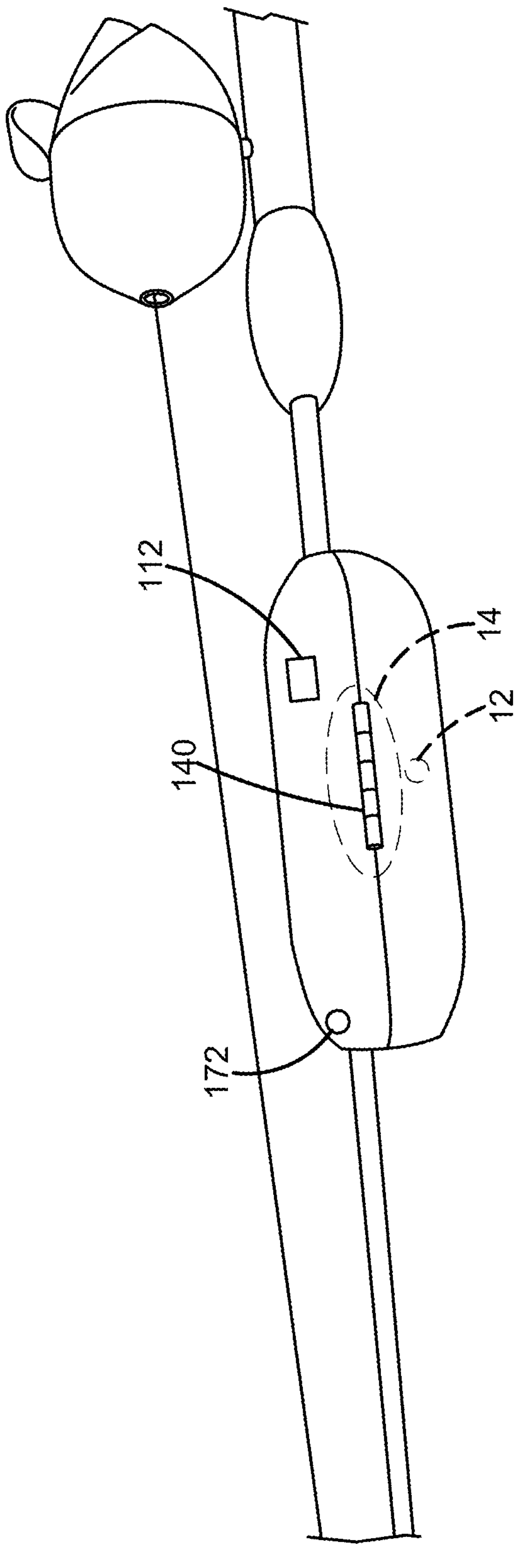
FIG. 2 illustrates a perspective view of one potential embodiment of a fishing hook cover device of the present invention while closed in accordance with the disclosed architecture.

The body 110 is comprised preferably of a tubular and/or cylindrical in shape but may be any shape. In the preferred embodiment, the body 110 is comprised of two semi-cylindrical halves 120,130, wherein the first half 120 attaches to the second half 130 via at least one hinge 140 of any type. The body 110 may also be comprised of at least one locking mechanism 160 that allows the first half 120 to be secured to the second half 130. More specifically, the halves 120,130 can be placed around a fishing rod 10 and around a fishing hook 12 and/or lure 14 such that the halves 120, 130 can then be closed around the rod 10, hook 12, and/or lure 14 and secured together via the mechanism 160, as seen in FIG. 2. This ensures the hook 12 and lure 14 cannot injure or snag any nearby individuals or items, as well as attaches the device 100 to the rod 10 for buoyancy purposes as described above. The locking mechanism 160 may be any type of locking mechanism such as but not limited to a clip lock, a clamp lock, a magnetic lock, a spring-loaded lock, a dial lock, a snap lock, etc.

To prevent the lure 14 and/or hook 12 from snagging on the interior surface 122,132 of each half 120,130, each interior surface 122,132 may be comprised of at least one protective member 150 that is preferably comprised of a rigid plastic (or any rigid material that cannot be penetrated by a hook 12). The member 150 may be curved in one embodiment. To further secure the lure 14 and/or hook 12 within the body 110, any portion of the interior of the body 110 may be comprised of at least one interior fastener 180, such as but not limited to a spring, a clip, a clamp, a loop, etc. that can receive and/or attach to the lure 14 and/or hook 12 to prevent the lure 14 and/or hook 12 from exiting the body 110 during use.

The body 110 may also be comprised of at least one opening 172. The opening 172 serves as a lanyard opening to allow the body 110 to be worn/easily stored when not in use. The opening 172 may be positioned on the locking mechanism 160 in one embodiment.

Figure 3:
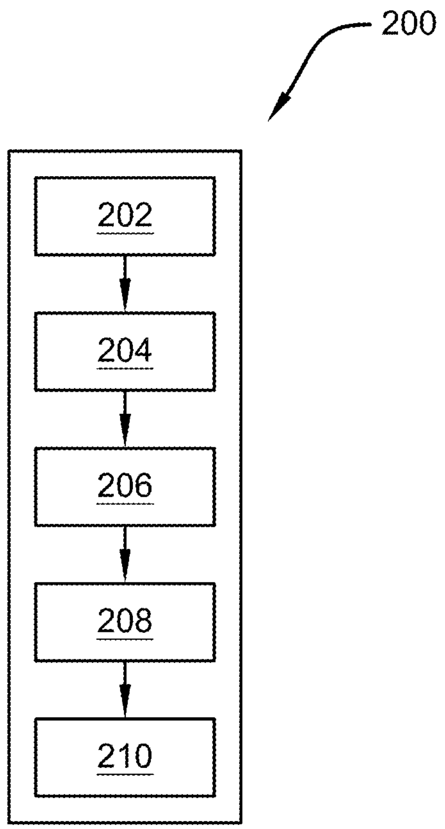
FIG. 3 illustrates a flowchart of a method of using one potential embodiment of a fishing hook cover device of the present invention in accordance with the disclosed architecture.

The present invention is also comprised of a method of using 200 the device 100, as seen in FIG. 3. First, a device 100 is provided comprised of a body 110 comprised of a first half 120 comprised of a first protective member 150 attached to a second half 130 comprised of a second protective member 150 via a hinge 140, an interior fastener 180, and a locking mechanism 160 [Step 202]. Then, the first half 120 can be separated from the second half 130 via disengaging the locking mechanism 160 [Step 204]. Next, the first half 120 and the second half 130 can be placed around a fishing lure 14 and a fishing hook 12 [Step 206]. Then, the hook 12 and/or the lure 14 to the interior fastener 180 [Step 208]. Finally, the first half 120 can be secured to the second half 130 via the locking mechanism 160 such that the hook 12 and lure 14 are secured within the body 110 [Step 210].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "fishing hook cover device" and "device" are interchangeable and refer to the fishing hook cover device 100 of the present invention.

Notwithstanding the forgoing, the fishing hook cover device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the fishing hook cover device 100 as shown in the FIGS. are for illustrative purposes only, and that many other sizes and shapes of the fishing hook cover device 100 are well within the scope of the present disclosure. Although the dimensions of the fishing hook cover device 100 are important design parameters for user convenience, the fishing hook cover device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fishing hook cover device comprising:
a body comprised of:
a hinge;
a first half comprised of a first interior surface comprised of a first protective member;
a second half attached to the first half via the hinge, the second half comprised of a second interior surface comprised of a second protective member;
a reflective element attached to the body for improving visibility of the body in low light conditions;
a spring configured to secure a lure or hook within the body; and
a magnetic lock; wherein the first and second halves are each neoprene halves.

2. The fishing hook cover device of claim 1, wherein the body is comprised of a neon color.

3. A fishing hook cover device comprising:
a body comprised of:

a phosphorescent coated reflective element attached to the body;

a hinge;

a lanyard opening in the body;

a first half comprised of a first interior surface comprised of a first protective member;

a second half attached to the first half via the hinge, the second half comprised of a second interior surface comprised of a second protective member;

a spring configured to secure a lure or hook within the body an interior fastener; and a spring-loaded lock; wherein the first and second halves are each EVA foam halves.

4. The fishing hook cover device of claim 3, wherein the body is comprised of a cylindrical shape.

5. A method of using a fishing hook cover device, the method comprising the following steps:

providing a fishing hook cover device comprised of a first half comprised of a first curved rigid plastic protective member attached to a second half comprised of a second curved rigid plastic protective member via a hinge, an interior fastener, and a locking mechanism comprising a lanyard opening;

separating the first half from the second half via disengaging the locking mechanism;

placing the first half and the second half around a fishing lure and a fishing hook;

attaching the fishing lure and the fishing hook to the interior fastener; and magnetically securing the first half to the second half via the locking mechanism, wherein the first and second halves are each PVC foam halves.

6. The method of using a fishing hook cover device of claim 5, wherein the interior fastener is comprised of a spring.

7. The method of using a fishing hook cover device of claim 5, wherein the interior fastener is comprised of a clip.

8. The method of using a fishing hook cover device of claim 5, wherein the interior fastener is comprised of a clamp.

9. The method of using a fishing hook cover device of claim 5, wherein the interior fastener is comprised of a loop.

* * * * *